(12) United States Patent
Mitsui et al.

(10) Patent No.: US 7,393,016 B2
(45) Date of Patent: Jul. 1, 2008

(54) FRONT VEHICLE BODY STRUCTURE

(75) Inventors: Jun Mitsui, Wako (JP); Goro Tsujino, Wako (JP); Shigeto Yasuhara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 388 days.

(21) Appl. No.: 11/338,074

(22) Filed: Jan. 24, 2006

(65) Prior Publication Data

US 2006/0181071 A1 Aug. 17, 2006

(30) Foreign Application Priority Data

Jan. 26, 2005 (JP) ............................. 2005-018405

(51) Int. Cl.
*B62D 21/00* (2006.01)
(52) U.S. Cl. ............................. 280/784; 280/124.109; 180/232; 180/312; 296/187.08
(58) Field of Classification Search ................. 280/784, 280/124.109, 232, 312; 296/187.01, 187.03, 296/187.08
See application file for complete search history.

(56) References Cited

U.S. PATENT DOCUMENTS

| | | | |
|---|---|---|---|
| 3,774,712 A * | 11/1973 | Froumajou | |
| 5,074,374 A * | 12/1991 | Ohtake | |
| 5,887,896 A * | 3/1999 | Kobayashi et al. | |
| 6,109,654 A * | 8/2000 | Yamamoto et al. | |
| 6,131,685 A * | 10/2000 | Sakamoto et al. | |
| 6,378,645 B1 * | 4/2002 | Uegane et al. | ............... 180/309 |
| 6,390,224 B1 * | 5/2002 | Yoshida | |
| 6,511,096 B1 * | 1/2003 | Kunert | |
| 6,722,696 B2 * | 4/2004 | Sonomura et al. | |
| 6,957,846 B2 * | 10/2005 | Saeki | |
| 6,997,276 B2 * | 2/2006 | Yoshida et al. | |
| 7,144,039 B2 * | 12/2006 | Kawasaki et al. | |
| 7,213,873 B2 * | 5/2007 | Murata et al. | |
| 2004/0200659 A1 * | 10/2004 | Miyasaka | .................... 180/312 |
| 2007/0252412 A1 * | 11/2007 | Yatsuda | |

FOREIGN PATENT DOCUMENTS

JP 3226896 8/2001

* cited by examiner

*Primary Examiner*—Toan C To
(74) *Attorney, Agent, or Firm*—Rankin, Hill & Clark LLP

(57) ABSTRACT

Front vehicle body structure includes left and right front side frames, a subframe provided on the undersides of the side frames, and left and right mounting brackets for connecting the side frames and subframe. Engine-transmission unit is mounted on the subframe. Respective rear half portions of the side frames extend toward the rear of the vehicle body while gradually approaching the centerline of the vehicle body. Left and right mounting brackets are provided, on the respective rear half portions, to project toward the centerline. The left and right mounting brackets are detachably connected to the subframe. When an impact load greater than a predetermined intensity has been applied, the left and right mounting brackets are detached from the subframe and then squashed by the engine-transmission unit while effectively absorbing the impact.

3 Claims, 13 Drawing Sheets

FIG. 10A
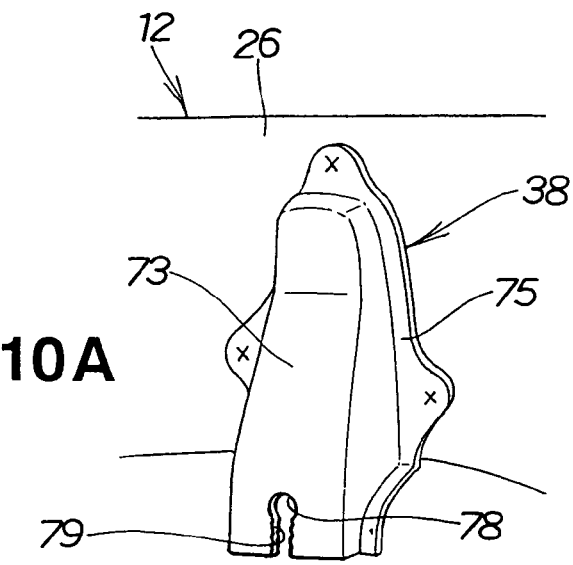
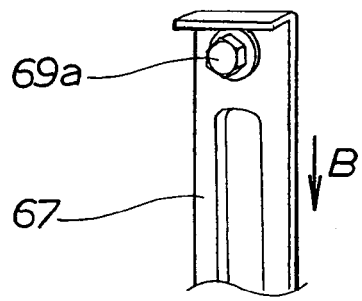
FIG. 10B
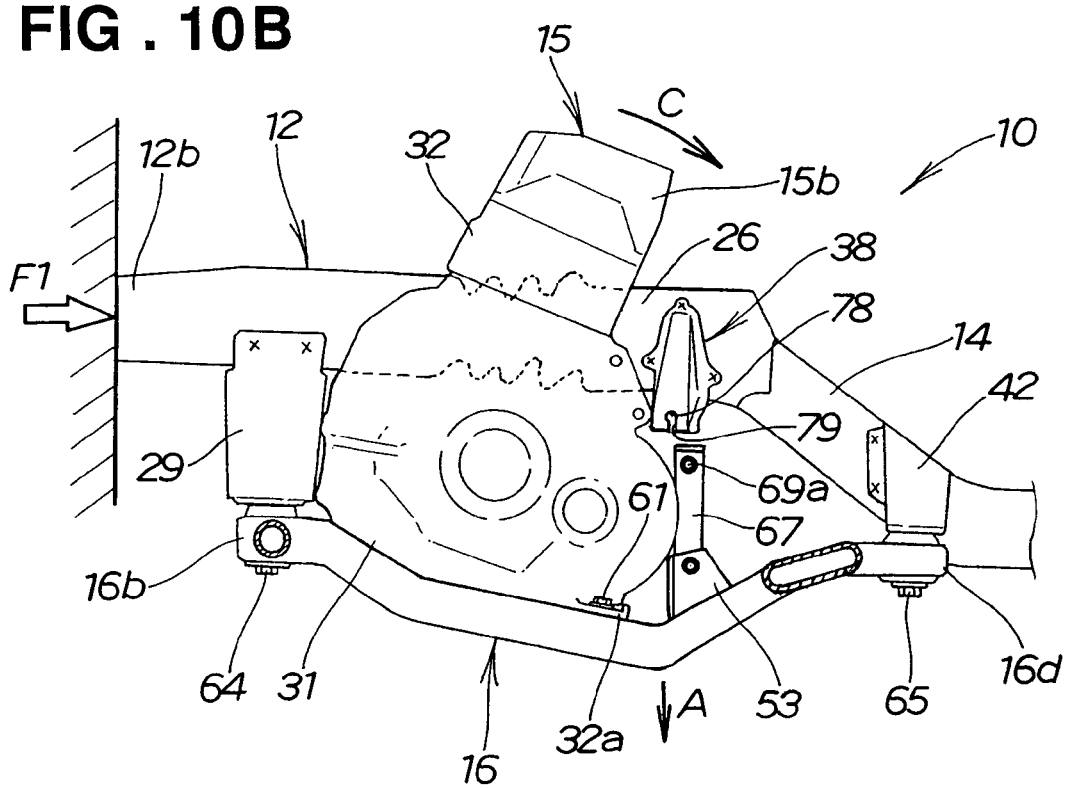

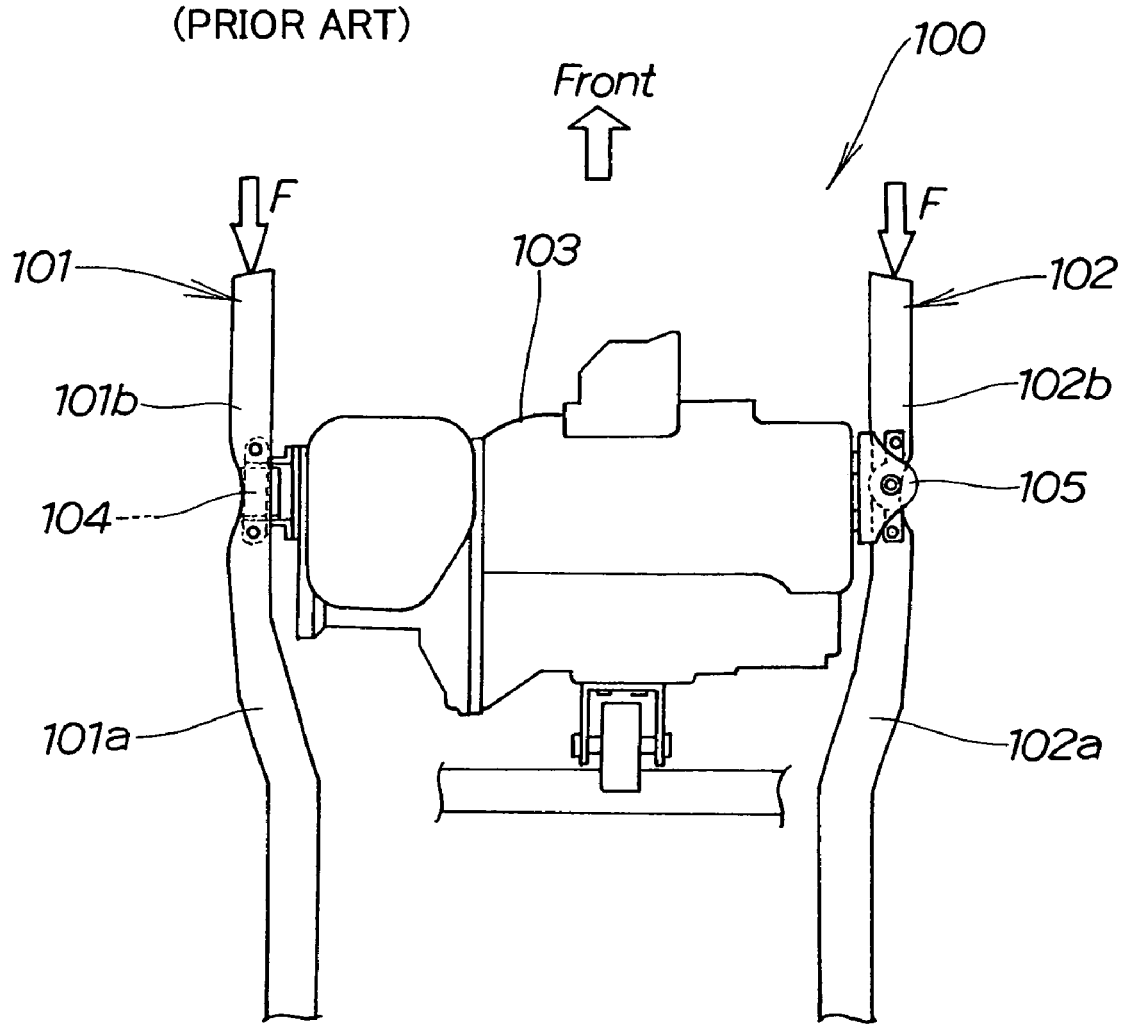

FRONT VEHICLE BODY STRUCTURE

FIELD OF THE INVENTION

The present invention relates generally to front vehicle body structures and more particularly to an improved front vehicle body structure including left and right front side frames and having an engine-transmission unit mounted between the side frames.

BACKGROUND OF THE INVENTION

From Japanese Patent No. 3226896, for example, there is known a front vehicle body structure for motor vehicles, where left and right front side frames 101 and 102 have their respective rear half portions that are bent relative to their front half portions toward each other, i.e. inwardly in a width direction of the vehicle, to prevent an engine-transmission unit from being accidentally displaced into a vehicle compartment.

The front vehicle body structure disclosed in the 3226896 patent will be described with reference to FIG. 13 hereof. The disclosed front vehicle body structure 100 includes left and right front side frames 101 and 102 disposed in a front section of the vehicle body. Of the left and right front side frames 101 and 102, portions 101a and 102a located rearwardly of the engine-transmission unit 103 are bent toward each other, i.e. inwardly in a width direction of the vehicle. The engine-transmission unit 103 is fixedly mounted, via mounting members 104 and 105, between respective front half portions 101b and 102b of the left and right front side frames 101 and 102.

As an impact load F is applied rearwardly to the front ends of the left and right front side frames 101 and 102, the front side frames 101 and 102 more or less compress or get squashed due to the applied load F, which could displace the engine-transmission unit 103 toward the rear of the vehicle body. However, such displacement of the engine-transmission unit 103 can be effectively prevented by the unit 103 abutting against the inwardly-bent rear portions 101a and 102a of the left and right front side frames 101 and 102. Thus, the engine-transmission unit 103 is prevented from abutting against a dashboard panel partitioning between the vehicle compartment and an engine room, so that a predetermined space in the vehicle compartment can be maintained or secured despite the applied impact load.

However, if the impact load F is relatively great, it may not be appropriately absorbed by only the compression or squash of the left and right front side frames 101 and 102. In such a case, the engine-transmission unit 103 would hit the inwardly-bent portions 101a and 102a without the impact load F being sufficiently absorbed. Therefore, there is a need to enhance more than necessary the rigidity of the engine-transmission unit 103 and left and right front side frames 101 and 102, in which regard a further improvement has to be made.

SUMMARY OF THE INVENTION

In view of the foregoing prior art problems, it is an object of the present invention to provide an improved front vehicle body structure which can reliably absorb an impact load before the engine-transmission unit hits the left and right front side frames.

In order to accomplish the above-mentioned object, there present invention provides an improved front vehicle body structure, which comprises: a vehicle body frame including left and right front side frames; a subframe provided on the underside of the vehicle body frame and supporting an engine-transmission unit; an impact absorbing section formed by respective rear half portions of the two front side frames extending toward the rear of the vehicle body while gradually approaching the centerline of the vehicle body, the impact absorbing section preventing the engine-transmission unit from being displaced toward the rear of the vehicle body when a load has been applied from front ends of the left and right front side frames toward the rear of the vehicle body; and left and right mounting brackets provided, on the respective rear half portions of the left and right front side frames forming the impact absorbing section, to project toward the centerline of the vehicle body, the left and right mounting brackets being detachably connected to the subframe. When an impact load has been applied to the left and right front side frames, the left and right mounting brackets are detached from the subframe, and then the detached left and right mounting brackets are compressed or squashed by the engine-transmission unit while absorbing the impact.

When a relatively great impact load has been applied rearwardly to the front ends of the left and right front side frames, the left and right mounting brackets in the present invention are detached from the subframe, and then the detached left and right mounting brackets are compressed or squashed by the engine-transmission unit. The applied impact load can be sufficiently absorbed by the left and right mounting brackets being squashed by the engine-transmission unit. After that, the engine-transmission unit abuts against the rear half portions of the left and right mounting brackets. Namely, with the provision of the left and right mounting brackets, the impact load can be reliably absorbed before the engine-transmission unit abuts against the rear half portions of the left and right front side frames. Therefore, it is not necessary to enhance more than necessary the rigidity of the engine-transmission unit and left and right front side frames.

Preferably, when a predetermined load has been applied, the left and right mounting brackets are detached from the subframe by breakage of lower portions of the mounting brackets.

Further, it is preferable that, as viewed in plan, the left and right mounting brackets each have a generally U plane cross-sectional shape such that the two mounting brackets are opposed to each other with the centerline of the vehicle body therebtween. Such arrangements allow the left and right mounting brackets to be squashed by the engine-transmission unit in a gradual manner, with the result that the impact load can be reliably absorbed.

BRIEF DESCRIPTION OF THE DRAWINGS

Certain preferred embodiments of the present invention will hereinafter be described in detail, by way of example only, with reference to the accompanying drawings, in which:

FIGS. 10A and 10B are views showing the front subframe having been detached from the left and right middle mounting brackets;

FIG. 13 is a view showing a conventional front vehicle body structure.

DETAILED DESCRIPTION OF THE PREFERRED EMBODIMENTS

Figure 1:
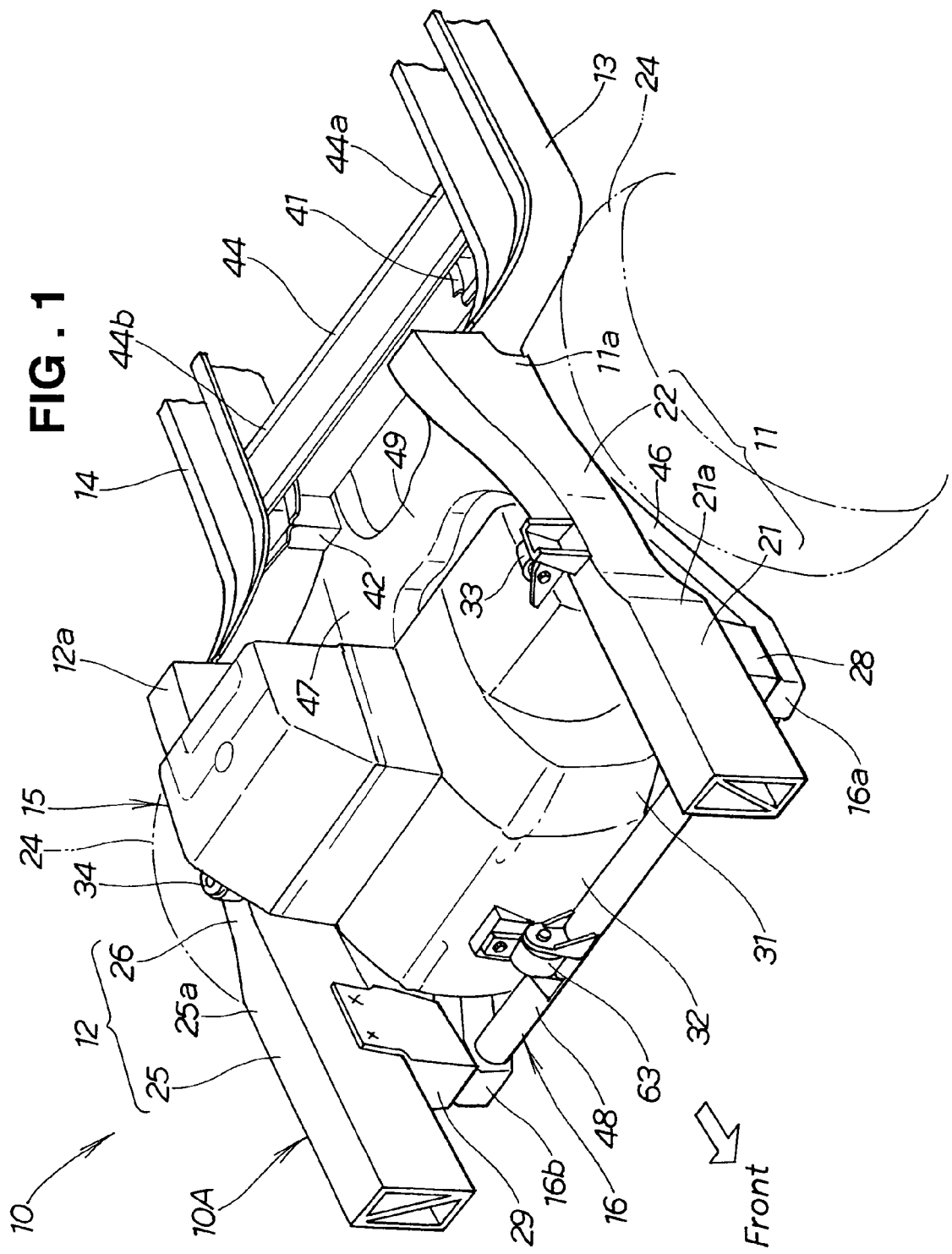
FIG. 1 is a perspective view of a front vehicle body structure in accordance with an embodiment of the present invention.
Figure 2:
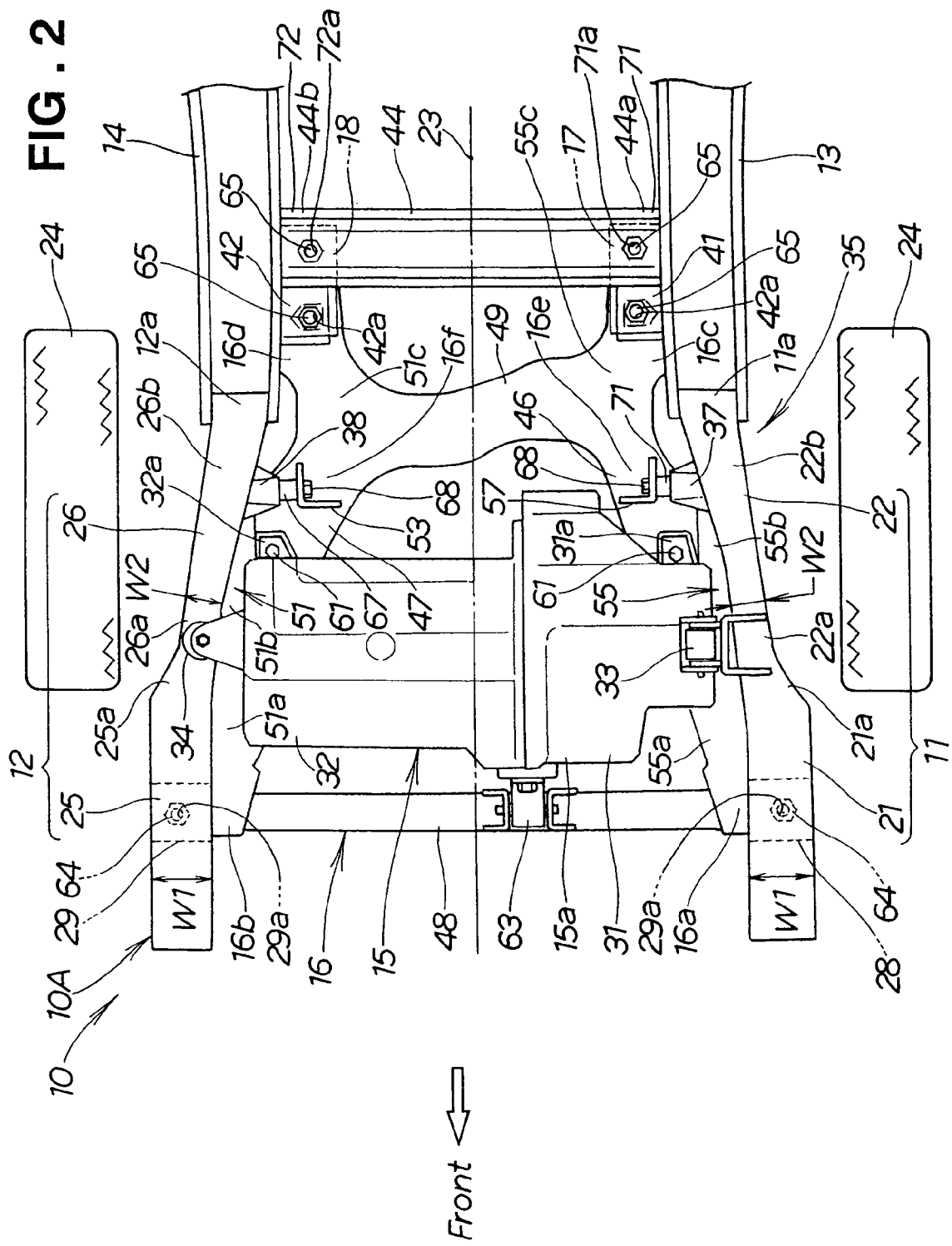
FIG. 2 is a plan view of the front vehicle body structure shown in FIG. 1.
Figure 3:
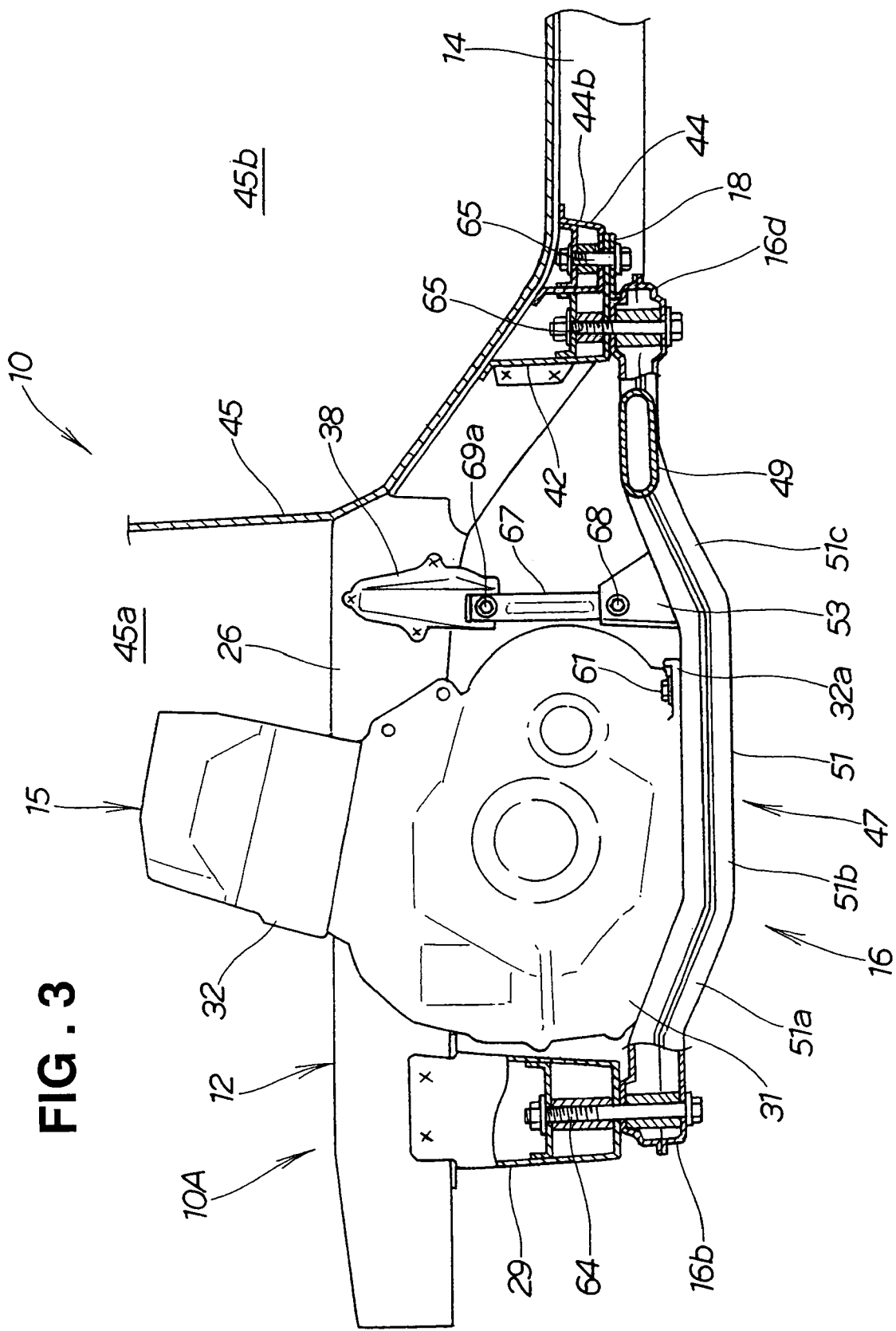
FIG. 3 is a sectional view of the front vehicle body structure shown in FIG. 2.

FIG. 1 is a perspective view of a front vehicle body structure in accordance with an embodiment of the present invention, FIG. 2 is a plan view of the front vehicle body structure, and FIG. 3 is a sectional view of the front vehicle body structure. As seen in FIGS. 1, 2 and 3, the front vehicle body structure 10 of the present invention includes a front vehicle body frame 10A. The front vehicle body frame 10A includes left and right front side frames 11 and 12 that extend in a length or forward/rearward direction of the vehicle and are spaced apart from each other in a width direction of the vehicle.

Left floor frame 13 extends rearwardly from the rear end 11a of the left front side frame 11, and a right floor frame 14 extends rearwardly from the rear end 12a of the right front side frame 12.

Engine-transmission unit 15 is disposed transversally between the left and right front side frames 11 and 12.

Front subframe 16 is fixed to the undersides of the left and right front side frames 11 and 12.

The engine-transmission unit 15 is mounted not only on the front subframe 16 but also on the left and right front side frames 11 and 12.

The left front side frame 11 includes front and rear half sections 21 and 22. The front half section 21 extends horizontally in the longitudinal or length (forward/rearward) direction of the vehicle body. The rear half section 22 extends horizontally from the rear end 21a of the front half section 21 toward the rear of the vehicle body while gradually slanting toward a longitudinal centerline 23 of the vehicle body (i.e., centerline extending centrally through the width of the vehicle body).

Similarly, the right front side frame 12 includes front and rear half sections 25 and 26. The front half section 25 extends horizontally in the longitudinal or length (forward/rearward) direction of the vehicle body. The rear half section 26 extends horizontally from the rear end 25a of the front half section 25 toward the rear of the vehicle body while gradually slanting toward the longitudinal centerline 23 of the vehicle body.

More specifically, the rear half section 25 of the left front side frame 11 and the rear half section 26 of the right front side frame 12 gradually slant toward each other or toward the longitudinal centerline 23, so that there is formed a gradually-narrowing interval or distance between the rear half sections 25 and 26.

Left and right front mounting brackets 28 and 29 for mounting the front subframe 16 on the left and right front side frames 11 and 12 are fixed to the undersides of the front half section 21 and 25 of the left and right front side frames 11 and 12 and bolded to left and right front end portions 16a and 16b, respectively, of the front subframe 16.

In the left front side frame 11, as shown in FIG. 2, a front end portion 22a of the rear half section 22 has a width W2 smaller than a width W1 of the front half section 21. With the smaller width W2 of the front end portion 22a, there is formed a space to prevent a front end portion of a left front wheel 24 from interfering with the front end portion 22a when the left front wheel 24 is steered right.

The transmission 31 of the engine-transmission unit 15 is mounted on the front end portion 22a of the rear half section 22 via a transmission mount 33.

Similarly, in the right front side frame 12, a front end portion 26a of the rear half section 26 has a width W2 smaller than a width W1 of the front half section 25. With the smaller width W2 of the front end portion 26a, there is formed a space to prevent a front end portion of a right front wheel 24 from interfering with the front end portion 26a when the right front wheel 24 is steered left.

The engine 32 of the engine-transmission unit 15 is mounted on the front end portion 26a of the rear half section 26 via an engine mount 34.

As stated above, the rear half sections 22 and 26 of the left and right front side frames 11 and 12 extend toward the rear of the vehicle body while slanting toward, or gradually approaching, the longitudinal centerline 23 of the vehicle body. In this way, the left and right rear half sections 22 and 26 together form an impact absorbing section 35 gradually narrowing in rear portions 22b and 26b behind the engine-transmission unit 15.

The left-side rear portion 22b of the impact absorbing section 35 has a left middle mounting bracket 37 projecting toward the longitudinal centerline 23 of the vehicle body. Further, the right-side rear portion 26b of the impact absorbing section 35 has a right middle mounting bracket 38 projecting toward the longitudinal centerline 23 of the vehicle body.

Of the front subframe 16, a left mounting section 16e located rearwardly of the engine-transmission unit 15 is detachably connected to the left middle mounting bracket 37, and a right mounting section 16f located rearwardly of the engine-transmission unit 15 is detachably connected to the right middle mounting bracket 38.

As best seen in FIG. 1, the left floor frame 13 slopes downwardly and rearwardly from the rear end 11a of the left front side frame 11 to a partway position thereof, from which it extends horizontally toward the rear of the vehicle body.

Similarly, the right floor frame 14 slopes downwardly and rearwardly from the rear end 12a of the right front side frame 12 to a partway position thereof, from which it extends horizontally toward the rear of the vehicle body.

Left rear mounting bracket 41 is provided on an inner side the left floor frame 13, and a right rear mounting bracket 42 is provided on an inner side the right floor frame 14.

Dashboard lower cross member 44 is connected between and fixed to the left and right floor frames 13 and 14, and the left and right rear mounting brackets 41 and 42 are secured at their rear ends to the lower cross member 44.

The above-mentioned front vehicle body frame 10A generally comprises the left and right front side frames 11 and 12, left and right floor frames 13 and 14, and dashboard lower cross member 44.

The front subframe 16 is bolted at its left rear end portion 16c to the left rear mounting bracket 41. Further, a left bracket 17 is not only secured to the left rear end portion 16c but also bolted to a left end portion 44a of the dashboard lower cross member 44.

Further, the front subframe 16 is bolted at its right rear end portion 16d to the right rear mounting bracket 42. Further, a right bracket 18 is not only secured to the right rear end portion 16d but also bolted to a right end portion 44b of the dashboard lower cross member 44.

In the aforementioned manner, the front subframe 16 is fixed to the underside of the front vehicle body frame 10A.

The front subframe 16 is a generally rectangular frame, which comprises left and right subframe sections 46 and 47 extending along the left and right front side frames 11 and 12, a front sub-cross-member 48 connected between and fixed to front end portions of the left and right subframe sections 46 and 47, and a rear sub-cross-member 49 connected between and fixed to rear end portions of the left and right subframe sections 46 and 47.

As illustrated in FIG. 3, a dashboard lower member 45, partitioning between an engine room 45a and a vehicle compartment 45b, is provided over the left and right floor frames 13 and 14.

The front subframe 16 is fixed to the left and right front side frames 11 and 12 and to the left and right floor frames 13 and 14.

The right subframe section 47 of the front side frame 16 has a right concave portion 51 concavely formed between the left and right front end portions 16b and 16d and shaped like a ship bottom.

The right concave portion 51 has a right downwardly-sloping region 51a sloping downwardly from the right front end portion 16b, a right horizontal region 51b extending horizontally from the rear end of the right downwardly-sloping region 51a toward the rear of the vehicle body, and a right upwardly-sloping region 51c sloping upwardly from the rear end of the right horizontal region 51b up to the right front end portion 16d.

Right mounting base section 53 is provided on the right upwardly-sloping region 51c and located rearwardly of the engine-transmission unit 15 (more specifically, behind the engine 32).

As seen in FIG. 2, the left subframe section 46 is positioned in horizontal (i.e., left-right) symmetrical relation to the right subframe section 47 about the centerline 23, and a left concave portion 55 shaped like a ship bottom is formed between the left front end portion and left rear end portion 16c.

The left concave portion 55 has a left downwardly-sloping region 55a sloping downwardly from the left front end portion 16a, a left horizontal region 55b extending horizontally from the rear end of the left downwardly-sloping region 55a, and a left upwardly-sloping region 55c sloping upwardly from the rear end of the left horizontal region 55b up to the left rear end portion 16c.

Left mounting base section 57 is provided on the left upwardly-sloping region 55c and located rearwardly of the engine-transmission unit 15 (more specifically, behind the transmission 31).

The transmission 31 of the engine-transmission unit 15 is placed on the left concave portion 55 of the left subframe section 46 and fixed at its rear lower mounting section 31a to the left horizontal region 55b by means of a bolt 61.

The engine 32 of the engine-transmission unit 15 is placed on the right concave portion 51 of the right subframe section 47 and fixed at its rear lower mounting portion 32a to the right horizontal region 51b by means of a bolt 61.

In addition, the engine-transmission unit 15 is mounted at its front end section 15a on the front sub-cross-member 48 via a front mount 63.

In the above-described manner, the engine-transmission unit 15 is kept placed on the front subframe 16.

Figure 4:
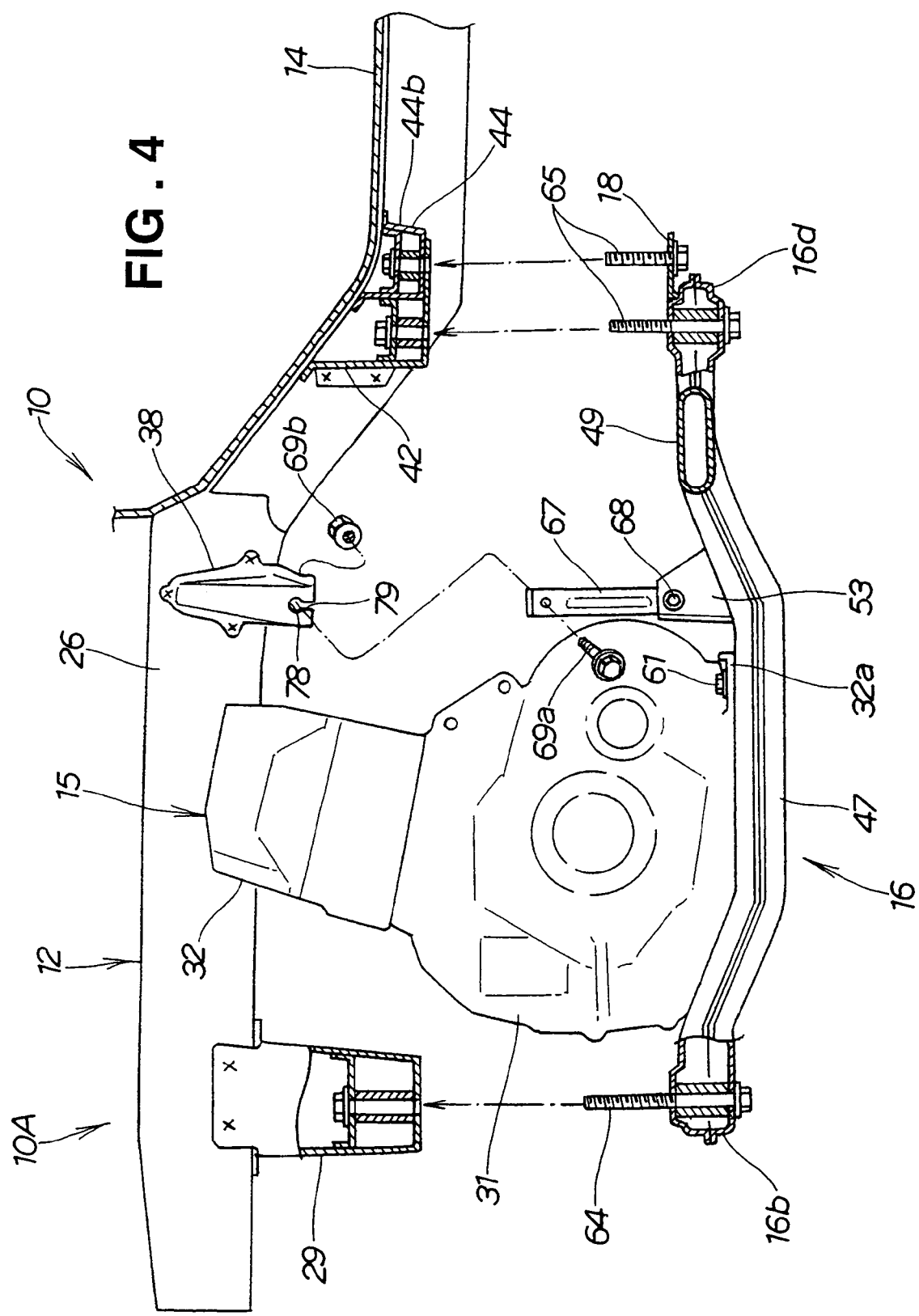
FIG. 4 is an exploded view of the front vehicle body structure shown in FIG. 3.

FIG. 4 is an exploded view of the front vehicle body structure of the present invention, which particularly shows the vehicle body frame 10A and front subframe 16 of FIG. 3 detached from each other. Here, the various left-side components of the vehicle body structure will also be described with additional reference to FIG. 2.

As clearly seen in FIG. 4, the right front end portion 16b of the front subframe 16 is connected via a bolt 64 to the right front mounting bracket 29, and the right rear end portion 16d is connected via bolts 65 to the right rear mounting bracket 42. The right bracket 18 provided on the right rear end portion 16d is connected via the bolts 65 to the right end portion 44b of the dashboard lower cross member 44.

Similarly, the left front end portion 16a of the front subframe 16 is connected via a bolt 64 to the left front mounting bracket 28, and the left rear end portion 16c is connected via bolts 65 to the left rear mounting bracket 41. The left bracket 17 provided on the left rear end portion 16c is connected via the bolts 65 to the left end portion 44a of the dashboard lower cross member 44.

In the above-described manner, the left front end portion 16a and left rear end portion 16c of the front subframe 16 are fixed to the underside of the left front side frame 11, while the right front end portion 16b and right rear end portion 16d of the front subframe 16 are fixed to the underside of the right front side frame 12.

After that, a right connecting member 67 is connected at its lower end portion to the right mounting base section 53 by means of a bolt 68, and also connected at its upper end portion to the right middle mounting bracket 38 by means of a bolt 69a (FIG. 3) and nut 69b.

Similarly, a left connecting member 71 is connected at its lower end portion to the left mounting base section 57 by means of a bolt 68, and also connected at its upper end portion to the left middle mounting bracket 37 by means of a bolt 69a (FIG. 3) and nut 69b (FIG. 4).

The left mounting base section 57, left connecting member 71 and left middle mounting bracket 37 are located in left-right symmetrical relation to the right mounting base section 53, right connecting member 67 and right middle mounting bracket 38, respectively.

Figure 5:
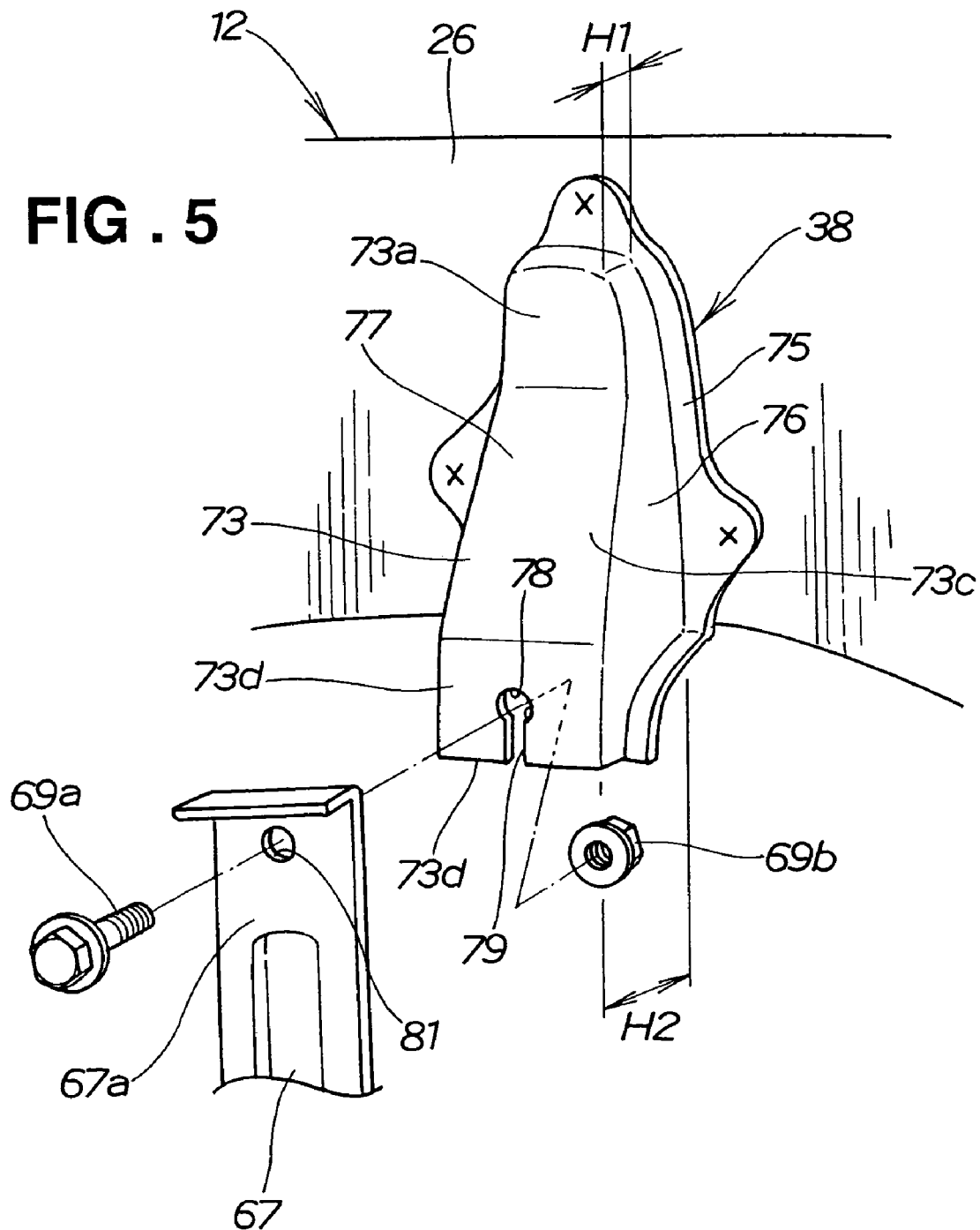
FIG. 5 is a perspective view of a right middle mounting bracket shown in FIG. 3.
Figure 6:
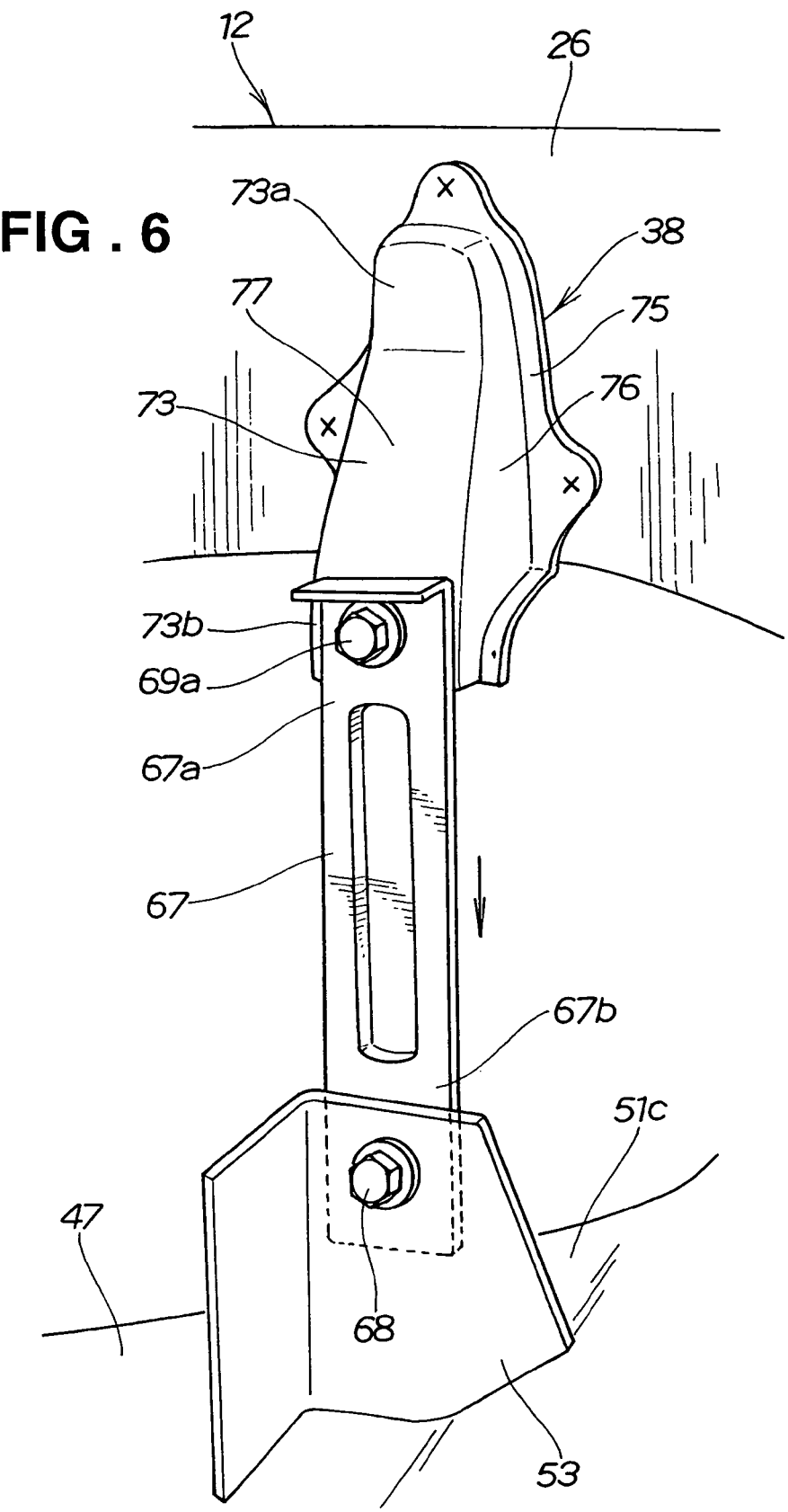
FIG. 6 is a perspective view showing the right middle mounting bracket of FIG. 5 connected to a front subframe.
Figure 7:
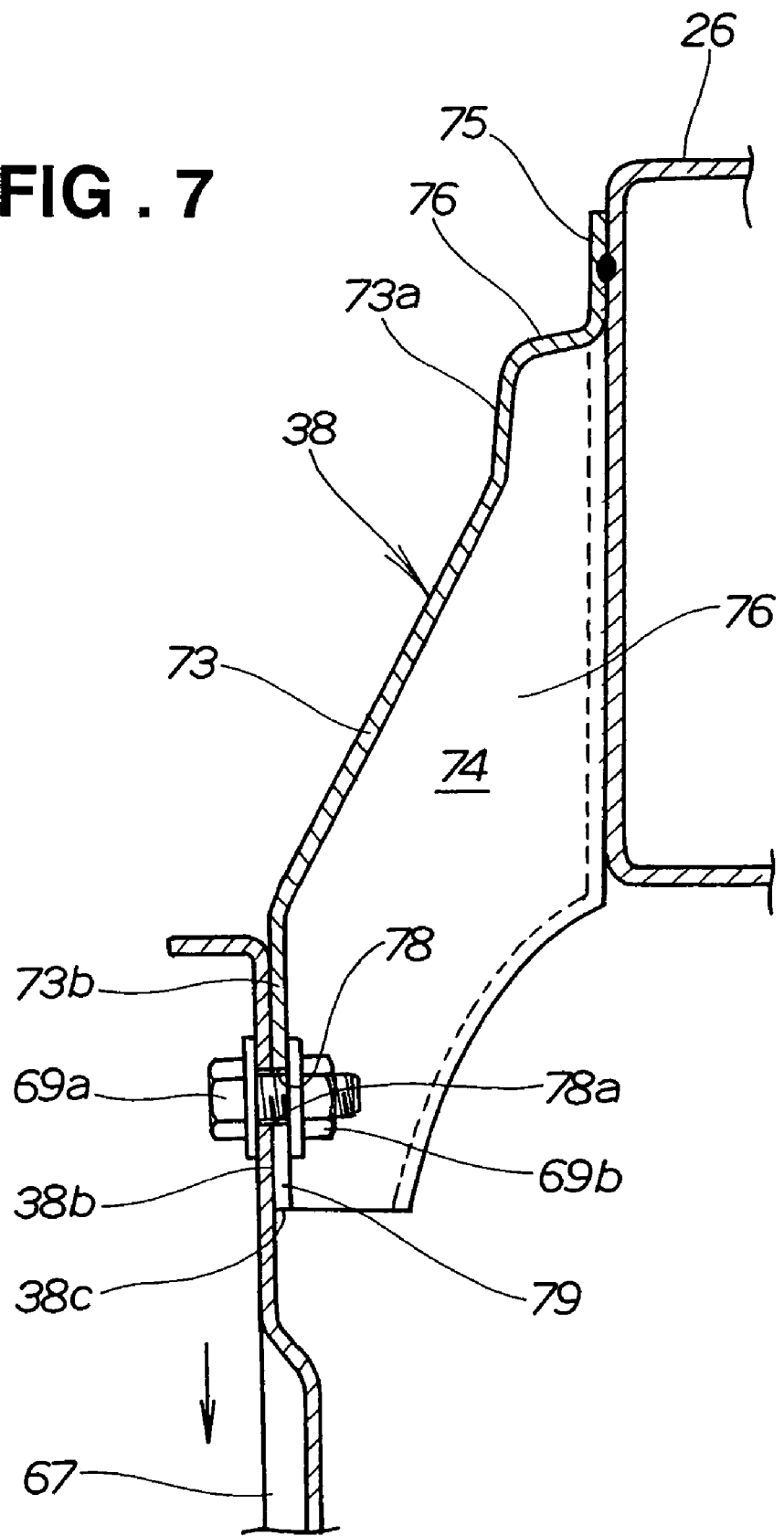
FIG. 7 is a sectional view of the right middle mounting bracket shown in FIG. 5.

The following paragraphs describe in greater detail the right middle mounting bracket 38 with reference to FIGS. 5-7. Description of the left middle mounting bracket 37 is omitted here because it is similar in construction to the right middle mounting bracket 38 and located in left-right symmetrical relation thereto.

As shown in FIGS. 5 and 7, the right middle mounting bracket 38 has a projecting section 73 projecting inwardly toward the centerline 23 of the vehicle body (see FIG. 2), and an overhanging or flange section 75 formed around the projecting section 73. The right middle mounting bracket 38 is secured to the right front side frame 12 by the flange section 75 being fixed to the right front side frame 12 by, for example, welding.

The projecting section 73 has a U sectional shape formed by a peripheral portion 76 and cover portion 77. The projecting section 73 also has an upper portion 73a, lower portion 73b and central portion 73c. The projecting section 73 is shaped in such a manner that the upper portion 73a has a projecting height H1 smaller than a projecting height H2 of the lower portion 73b, and that the central portion 73c has a projecting height gradually increasing in a direction from the upper portion 73a to the lower portion 73b. Namely, the central portion 73c slants inwardly and downwardly so that its lower region is located closer than its upper region to the vehicle body centerline 23.

The lower portion 73b has a mounting hole 78, and a slit 79 communicating with the mounting hole 78 and extending downwardly to a lower end edge 73d of the lower portion 73b. The slit 79 has a width smaller than the diameter of the mounting hole 78.

The right connecting member 67 is in the form of a vertical plate. The right connecting member 67 has a mounting hole 81 formed in its upper end portion 67a. The above-mentioned bolt 69a is inserted through the mounting hole 81 into the mounting hole 78 of the projecting section 73. The front subframe 16 is supported via the right middle mounting bracket 38 by screwing the nut 69b onto a part of the bolt 69a projecting out of the mounting hole 78. As will be later described, the right connecting member 67 can be detached from the right middle mounting bracket 38 as a great impact force is applied to the right connecting member 67. Namely, the right connecting member 67 is detachably connected to the right middle mounting bracket 38.

As noted above, the right middle mounting bracket 38 is formed in such a manner that the projecting height gradually increases in the direction from the upper portion 73a to the lower portion 73b; that is, the upper portion 73a of the right middle mounting bracket 38 is located closer than the lower portion 73b to the right front side frame 12. Thus, when a downward load is applied to the lower portion 73b of the right middle mounting bracket 38, the downward load is transmitted efficiently to the right front side frame 12 via the upper portion 73a.

Further, as an impact load is applied to the right middle mounting bracket 38, the bracket 38, having a hollow interior 74, can gradually get squashed while effectively absorbing the impact load.

As best seen in FIG. 6, the right connecting member 67 is connected at its lower end portion 67b to the right mounting base 53 by means of the bolt 68 and nut (not shown). The right mounting base 53 has an L shape as viewed in plan. The right mounting base 53 is secured to the right upwardly-sloping region 51c of the right subframe 47 by, for example, welding.

As explained above in relation to FIG. 5, the mounting hole 78 and slit 79 communicating with the mounting hole 78 and opening downward are formed in the lower portion 73b of the right middle mounting bracket 38. Thus, as a downward load is applied to the right connecting member 67 as indicated by an arrow, the bolt 69a is pushed downward out of the mounting hole 78 into the slit 79 and then descends along the slit 79 while expanding the width of the slit 79. During that time, the nut 69b descends along the slit 79 together with the bolt 69a. As a consequence, the bolt 69a and nut 69b are together detached from the right middle mounting bracket 38. Namely, the right middle mounting bracket 38 is detachably connected, via the right connecting member 67 and right mounting base 53, to the right upwardly-sloping region 51c (located between the front and rear end regions) of the right subframe 47.

Similarly to the right middle mounting bracket 38, the left middle mounting bracket 37 of FIG. 2 is detachably connected, via the left connecting member 71 and left mounting base 57, to the left upwardly-sloping region 55c (located between the front and rear end regions) of the left subframe 46.

Next, a description will be made about behavior of the front vehicle body structure 10, with primary reference to FIG. 8A-FIG. 12.

Figure 8A:
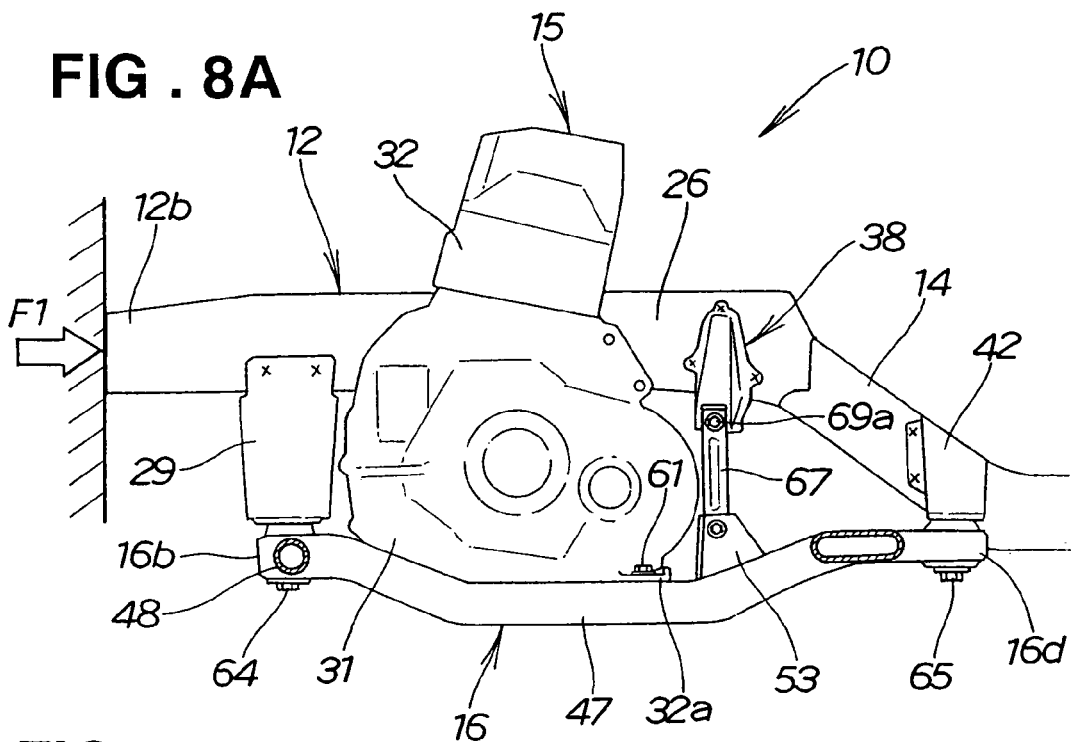
FIGS. 8A and 8B are views showing the front vehicle body structure when an impact load has been applied rearwardly to the front ends of left and right front side frames.
Figure 8B:
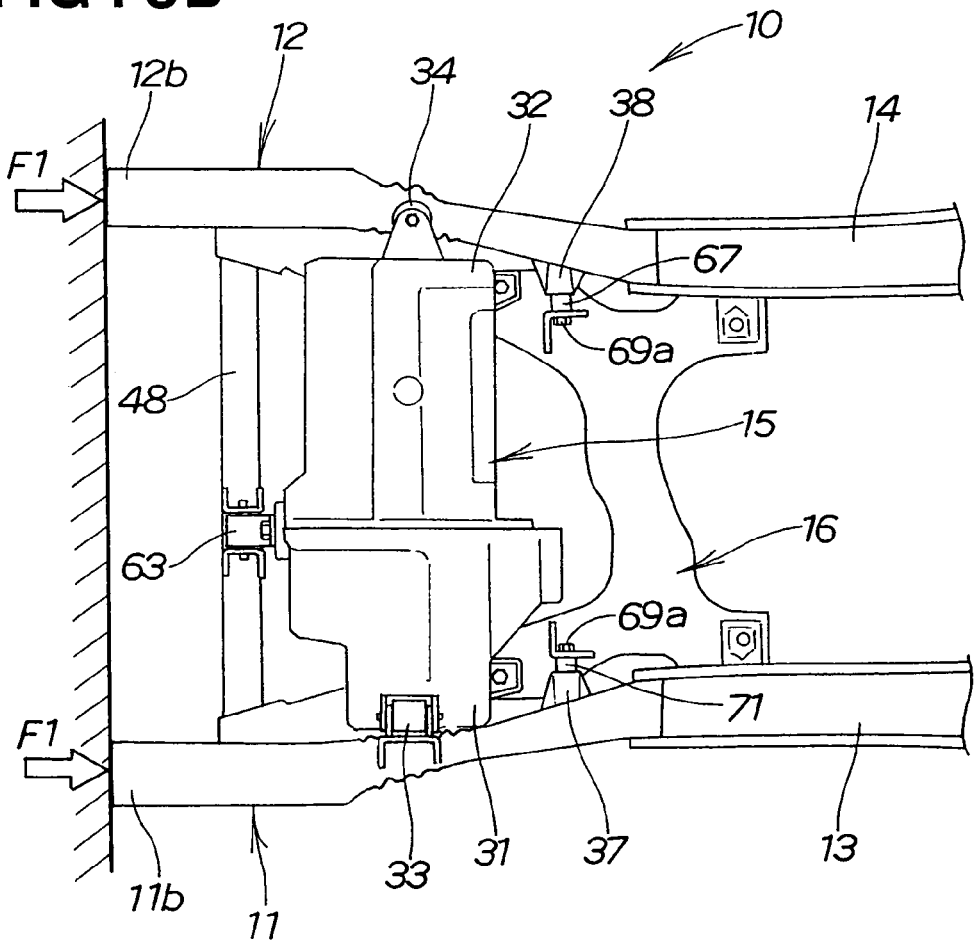

FIGS. 8A and 8B show the front vehicle body structure 10 when an impact load has been applied rearwardly to the front ends of the left and right front side frames 11 and 12.

As an impact force F1 is applied to the front ends 11b and 12b of the left and right front side frames 11 and 12 (the left front side frame 11 is shown in FIG. 8B) as illustrated in FIGS. 8A, the left and right front side frames 11 and 12 start getting squashed as seen in FIG. 8B.

Figure 9A:
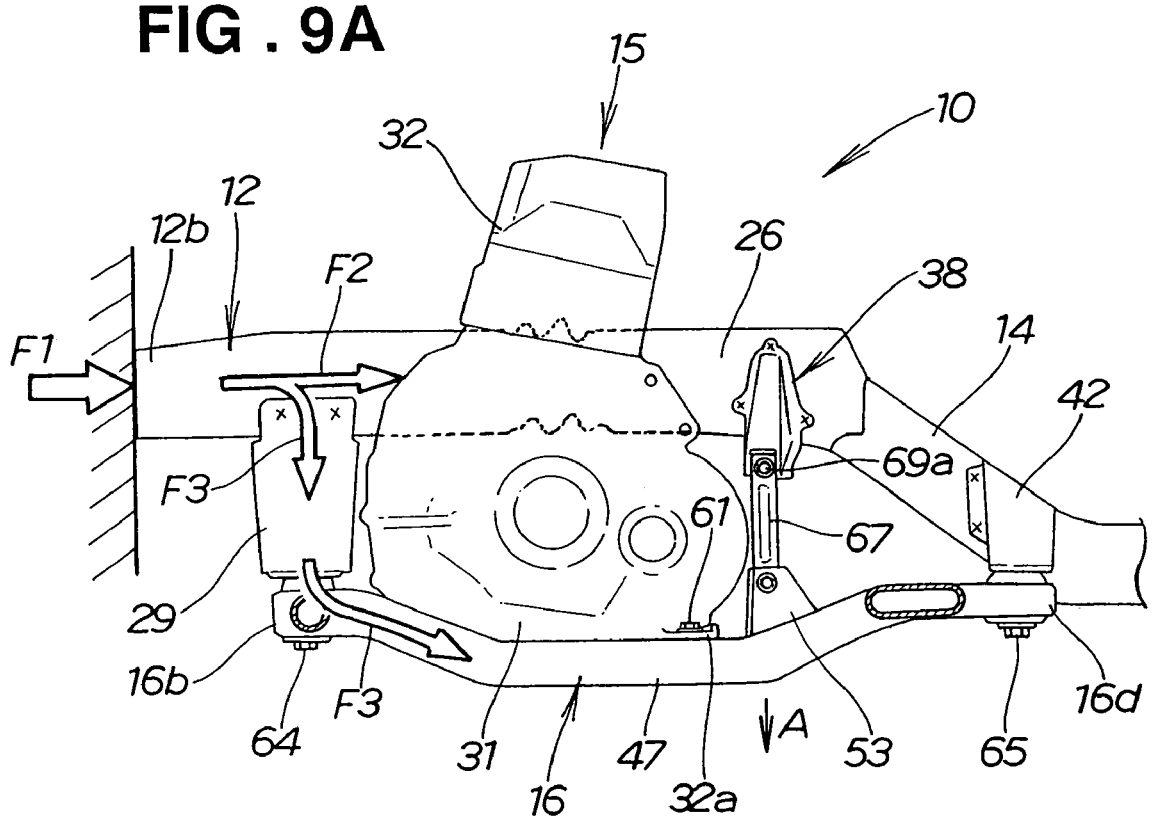
FIGS. 9A and 9B are views showing the front vehicle body structure when the applied impact force has been transmitted from the left and right front side frames to the front subframe.
Figure 9B:
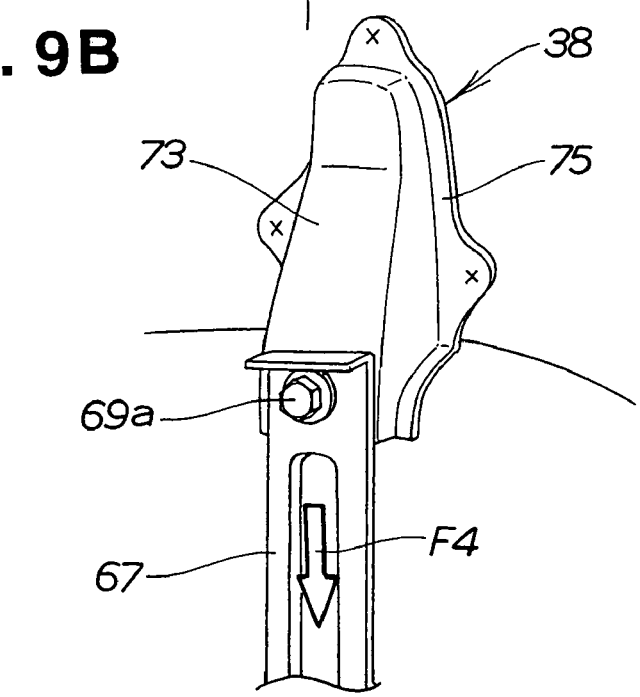

FIGS. 9A and 9B show the front vehicle body structure 10 when the applied impact force F1 has been transmitted to the front subframe 16.

As indicated by a white arrow in FIG. 9A, a portion F2 of the applied impact force F1 is transmitted to the left and right front side frames 11 and 12 (the left front side frame 11 is shown in FIG. 8B) as indicated by an arrow, while the remaining portion F3 of the applied impact force F1 is transmitted to the front subframe 16 as indicated by the arrow. As a consequence, the left and right front side frames 11 and 12 are slightly and squashed by the impact force F1.

Because the front subframe 16 is shaped like a ship bottom, a downward pressing force acts on the front subframe 16 as indicated by arrow A.

Namely, a downward load F4 is applied to the right connecting member 67, as illustrated in FIG. 9B, via which the load F4 is transmitted to the bolt 69a.

Similarly, the downward load F4 is transmitted to the left-side bolt 69a of FIG. 8B via the left connecting member 71.

FIGS. 10A and 10B shows the front subframe 16 having been detached from the left and right middle mounting brackets 37 and 38.

By the downward load F4 of FIG. 9B greater than a predetermined intensity value being transmitted to the right-side bolt 69a, the bolt 69a gets out of the mounting hole 78, descends along the slit 79 while expanding the width of the slit 79 and then completely comes off the right middle mounting bracket 38, as indicated by arrow B.

Similarly, by the downward load F4 of FIG. 9B, being transmitted to the left-side bolt 69a, the bolt 69a gets out of the left-side mounting hole 78, descends along the left-side slit 79 while expanding the width of the slit 79 and then completely comes off the left middle mounting bracket 37 (see FIG. 8B).

The front subframe 16 is detached from the left and right middle mounting brackets 37 and 38 as seen in FIG. 10B and then bent downward as indicated by arrow A of FIG. 10B. In this state, the left and right front side frames 11 and 12 continue to be compressed or squashed, so that an upper portion 15b of the engine-transmission unit 15 is displaced clockwise as indicated by arrow C.

Figure 11A:
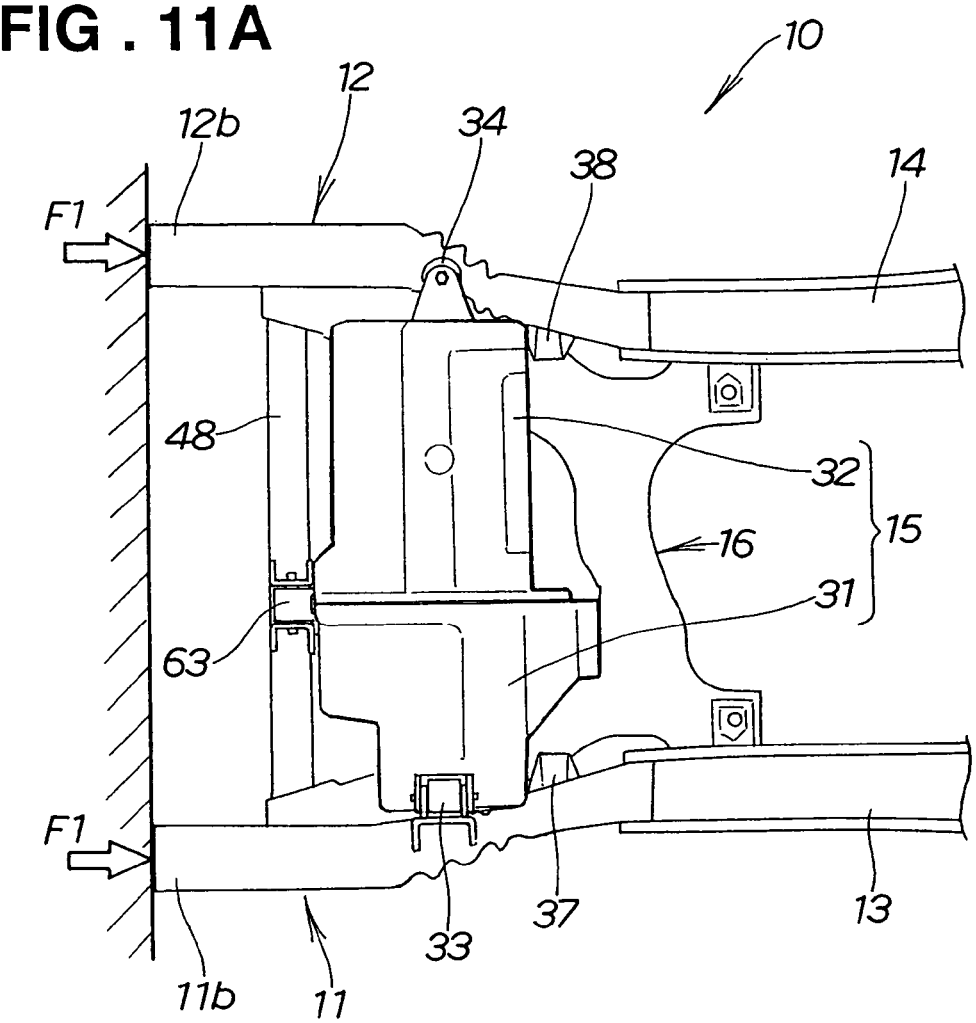
FIGS. 11A and 11B are views showing an engine-transmission unit having collided against the left and right middle mounting brackets.
Figure 11B:
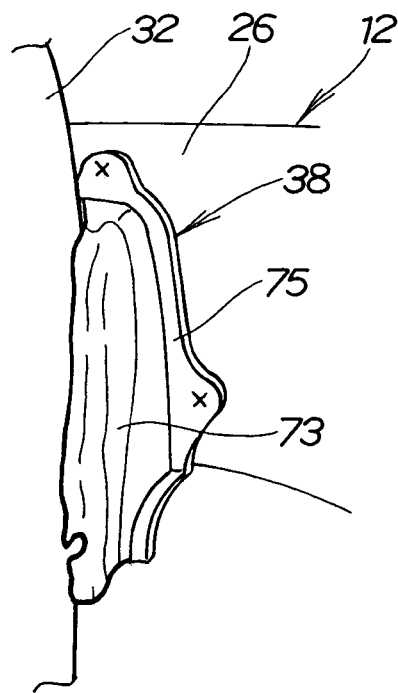

FIGS. 11A and 11B show how the left and right middle mounting brackets 37 and 38 collapse due to the applied load.

As shown in FIG. 11A, the transmission 31 of the engine-transmission unit 15 is brought into abutment against the left middle mounting bracket 37, while the engine 32 is brought into abutment against the right middle mounting bracket 38.

By the engine 32 being brought into abutment against the right middle mounting bracket 38, the right middle mounting bracket 38 is squashed sufficiently. Similarly, by the transmission 31 being brought into abutment against the left middle mounting bracket 37, the left middle mounting bracket 37 is squashed sufficiently.

The left and right front side frames 11 and 12 continue to be squashed until the abutment of the transmission 31 and engine 32 against the left and right middle mounting brackets 37 and 38 as noted above.

By the left and right front side frames 11 and 12 and the left and right middle mounting brackets 37 and 38 being squashed in the aforementioned manner, the impact load F1 can be absorbed sufficiently.

Figure 12:
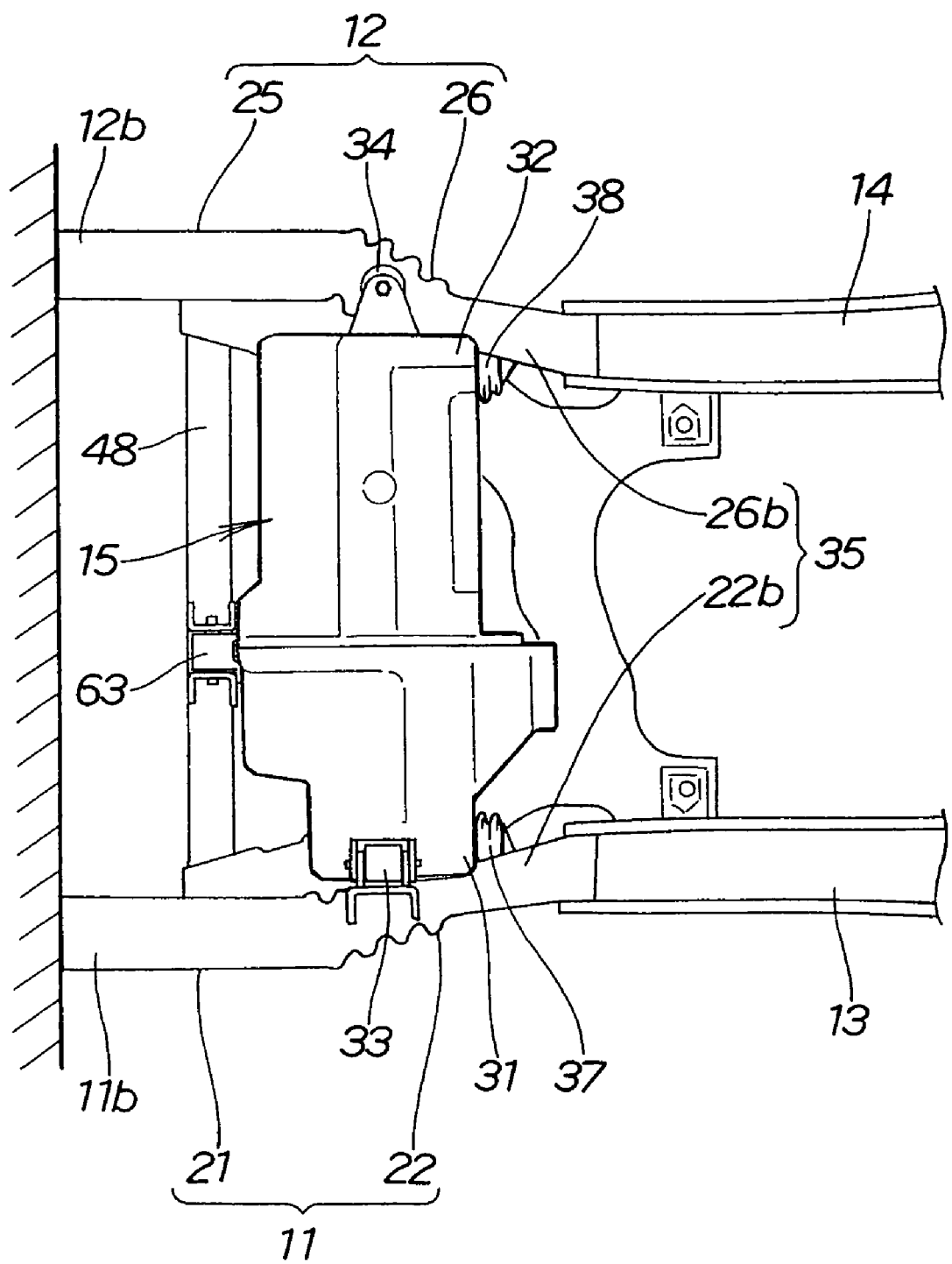
FIG. 12 is a view showing the left and right middle mounting brackets having been squashed by the engine-transmission unit.

FIG. 12 shows the left and right middle mounting brackets 37 and 38 having been squashed due to the impact load.

The impact absorbing section 35, formed by the rear portions 22b and 26b of the left and right front side frames 11 and 12 and having an overall shape gradually narrowing in the rearward direction of the vehicle body, is located rearwardly of the engine-transmission unit 15. Thus, the left and right middle mounting brackets 37 and 38 are squashed by the engine-transmission unit 15, to sufficiently absorb the impact load F1 (see FIG. 8A). Then, the engine-transmission unit 15 abuts against the impact absorbing section 35 of the left and right front side frames 11 and 12 by way of the left and right middle mounting brackets 37 and 38.

More specifically, the transmission 31 of the engine-transmission unit 15 abuts against the rear portion 22b of the left front side frame 11 via the left middle mounting bracket 37, while the engine 32 of the engine-transmission unit 15 abuts against the rear portion 26b of the right front side frame 12 via the right middle mounting bracket 38. Thus, the impact load F1 can be reliably absorbed before the engine-transmission unit 15 abuts against the left and right rear portions 22b and 26b.

In this manner, the left and right rear portions 22b and 26b can prevent the engine-transmission unit 15 from being displaced toward the rear of the vehicle body, so that the predetermined space in the vehicle compartment 45b (see FIG. 3) can be maintained or secured.

Further, because the impact load F1 can be reliably absorbed before the engine-transmission unit 15 abuts against the left and right rear portions 22b and 26b, it is not necessary to enhance more than necessary the rigidity of the engine-transmission unit 15 and left and right front side frames 11 and 12.

It should be appreciated that the shape and size of the left and right middle mounting brackets 37 and 38 in the instant embodiment may be modified as necessary; for example, the left and right middle mounting brackets 37 and 38 may be modified in width and projecting length.

Further, whereas the left and right middle mounting brackets 37 and 38 each have been illustrated as having a substantially rectangular shape, they are not limited to such a rectangular shape; for example, each of these brackets may have an elongated oval shape.

Furthermore, whereas the right middle mounting bracket 38 has been described as having the slit 79 formed in its lower portion 73b so that the bolt 69a can be disengaged or detached from the lower portion 73b as illustrated in FIG. 5, the present invention is not so limited; for example, and any other suitable means may be employed to detach the bolt 69a from the lower portion 73b. As one example, arrangements may be made such that, when a downward load greater than a predetermined intensity value has been applied to the bolt 69a, the bolt 69a can be detached from the lower portion 73b by breaking a part of the lower portion 73b between the mounting hole 78 and the lower end edge 73d; in this case, the distance between the mounting hole 78 and the lower end edge 73d is suitably adjusted to permit the breakage of the part.

Obviously, various minor changes and modifications of the present invention are possible in the light of the above teaching. It is therefore to be understood that within the scope of the appended claims the invention may be practiced otherwise than as specifically described.

What is claimed is:

1. A front vehicle body structure comprising:
    a vehicle body frame including left and right front side frames;
    a subframe provided on an underside of said vehicle body frame and supporting an engine-transmission unit;
    an impact absorbing section formed by respective rear half portions of said left and right front side frames extending toward a rear of the vehicle body while gradually approaching a centerline of the vehicle body, said impact absorbing section preventing the engine-transmission unit from being displaced toward the rear of the vehicle body when a load has been applied from front ends of said left and right front side frames toward the rear of the vehicle body; and
    left and right mounting brackets provided, on the respective rear half portions of said left and right front side frames forming said impact absorbing section, to project toward the centerline of the vehicle body, said left and right mounting brackets being detachably connected to said subframe,
    wherein, when an impact load has been applied to said left and right front side frames, said left and right mounting brackets are detached from said subframe, and then the detached left and right mounting brackets are squashed by the engine-transmission unit while absorbing the impact.

2. A front vehicle body structure according to claim 1 wherein, when a predetermined load has been applied, said left and right mounting brackets are detached from said subframe by breakage of lower portions of said mounting brackets.

3. A front vehicle body structure according to claim 1 wherein, as viewed in plan, said left and right mounting brackets each have a U plane cross-sectional shape and are opposed to each other with the centerline of the vehicle body therebtween.

* * * * *